Figure 1:
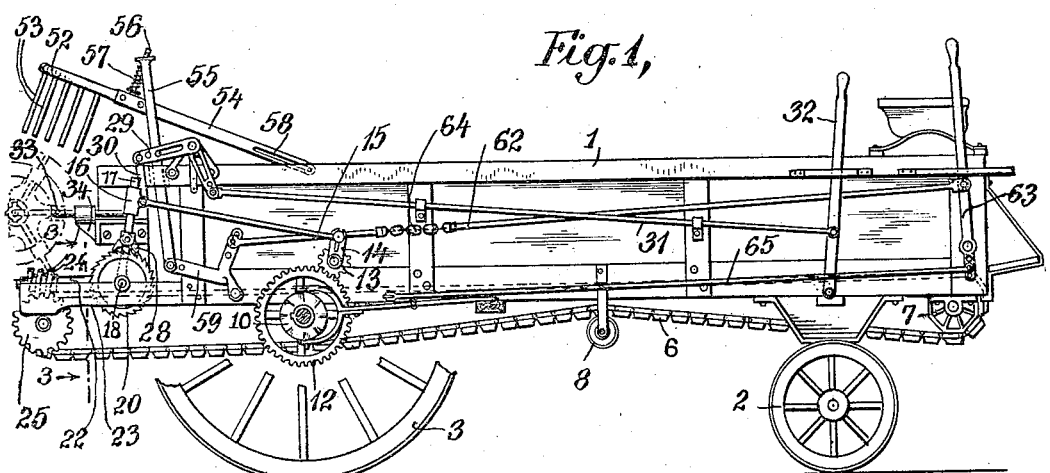

F. H. RYDER.
FERTILIZER SPREADER.
APPLICATION FILED AUG. 3, 1909.

1,007,493.

Patented Oct. 31, 1911.
2 SHEETS—SHEET 1.

WITNESSES:

INVENTOR
Frank H. Ryder
BY
ATTORNEY

F. H. RYDER.
FERTILIZER SPREADER.
APPLICATION FILED AUG. 3, 1909.
1,007,493.
Patented Oct. 31, 1911.
2 SHEETS—SHEET 2.
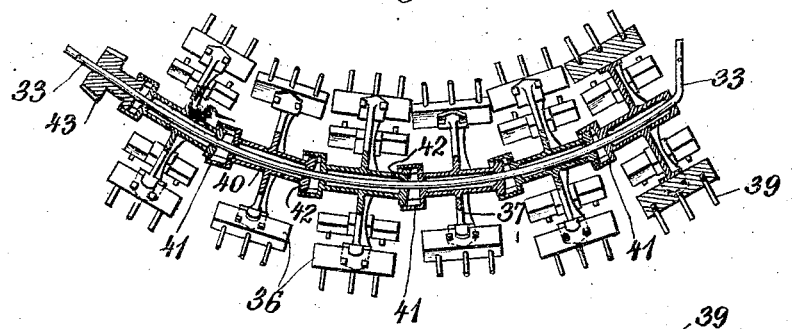
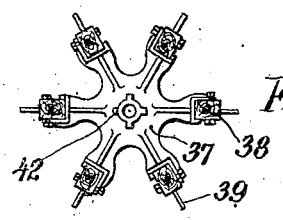
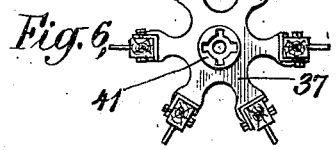
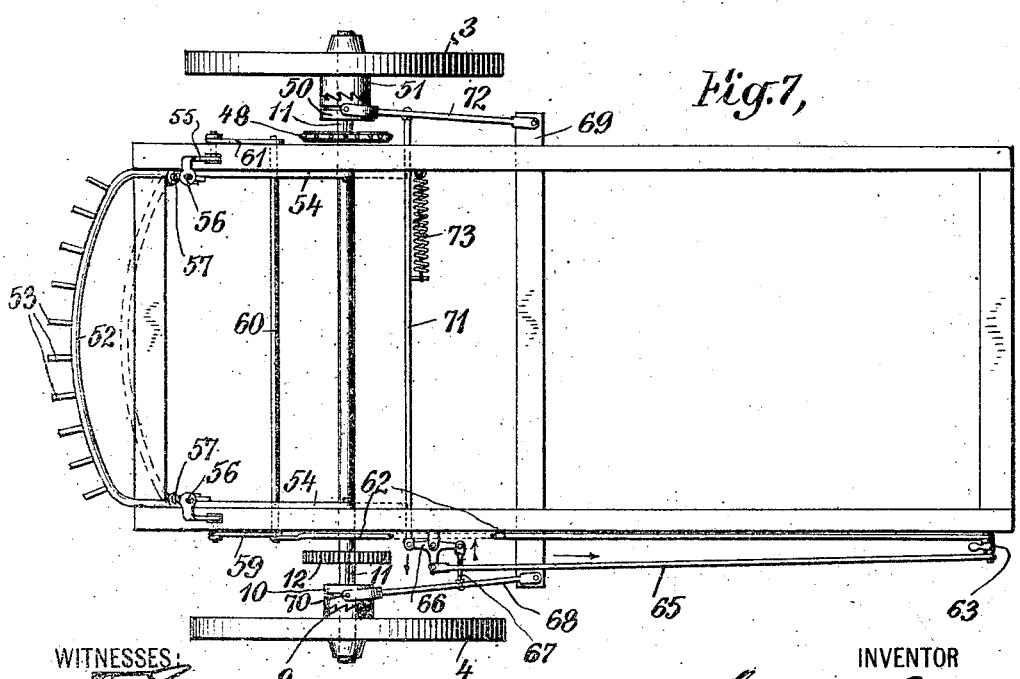

UNITED STATES PATENT OFFICE.

FRANK H. RYDER, OF COBLESKILL, NEW YORK.

FERTILIZER-SPREADER.

1,007,493.

Specification of Letters Patent.    Patented Oct. 31, 1911.

Application filed August 3, 1909. Serial No. 511,024.

*To all whom it may concern:*

Be it known that I, FRANK H. RYDER, a citizen of the United States, and a resident of Cobleskill, in the county of Schoharie and State of New York, have invented certain new and useful Improvements in Fertilizer-Spreaders, of which the following is a specification.

This invention is directed to the provision of an improved form of fertilizer-spreader for use in distributing fertilizer over a field.

The object of the invention is to effect certain improvements in the construction of spreaders of this character, to make them more reliable and efficient in operation and more convenient to use.

The spreader consists of a wagon the body of which has a movable bottom or floor, a rotary beater at the rear end of the body for throwing out the ferilizer carried to it by the moving floor, and means for connecting one of the rear wheels of the wagon to the beater so as to cause rotation thereof when the wagon is in motion.

One of the features of the invention consists in the improvement of the construction of the beater, this being preferably of a form comprising a plurality of beater sections arranged each at a slight angle to the adjacent ones, so that the complete beater has the form of the arc of a circle.

Another feature of the invention consists in the provision of an improved form of rake which when in one position is adapted to coöperate with the beater so as to level the surface of the fertilizer fed to the beater and to assist in breaking up lumps of the fertilizer. When in the position to operate in this way, the rake is yieldingly held, so that when occasion requires it will move more or less away from the beater against the tension of suitable springs. When coacting with the beater in this way, the rake is so positioned that the tines thereof extend downwardly upon the upper portion of the beater, but the rake is so arranged that it may be moved from this position to a position in front of the beater and within the body of the wagon, so that it will then serve as an end-gate for the wagon. The rake is connected with an operating lever mounted in a position convenient for the driver of the wagon, so that he may by operating this lever raise the rake from the position it occupies when used as an end-gate to its position in coöperation with the beater. The lever for operating the rake is also arranged to render the spreader operative and inoperative. For this purpose, the lever is connected to either or both the means for connecting one of the rear wheels in driving relation to the beater and the means for connecting one of the wheels to the feeding device for the floor of the wagon.

I have illustrated the preferred embodiment of my invention in the accompanying drawings, in which—

Figure 2:
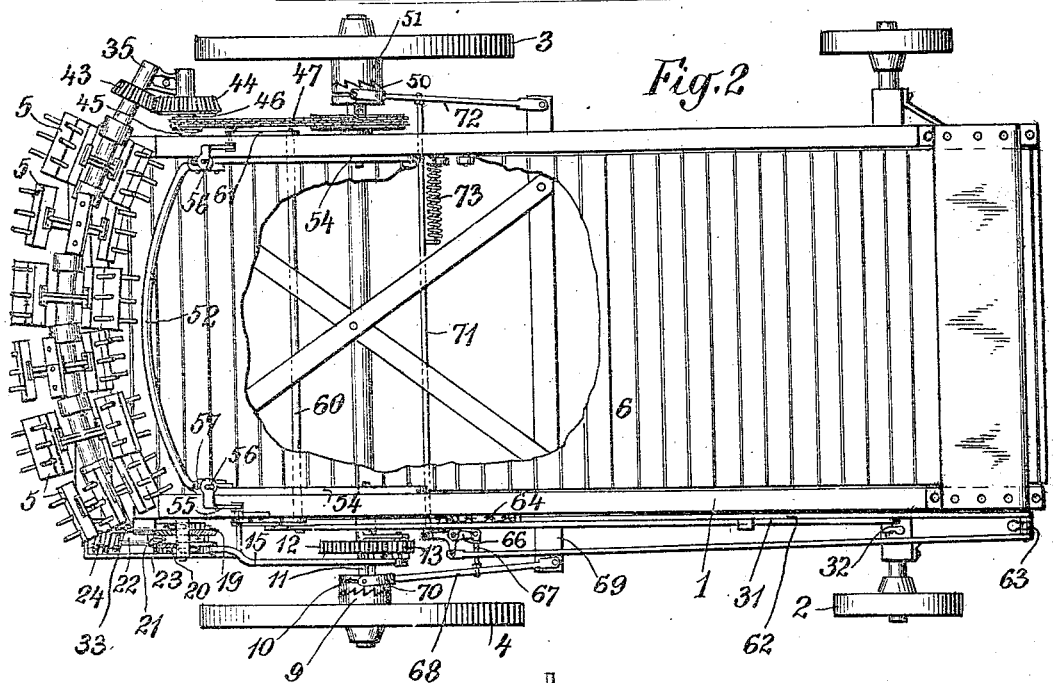
Figure 3:
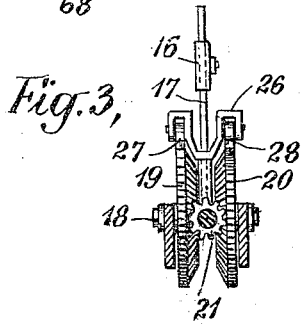

Figure 1 is a side elevation of the spreader, certain parts being omitted; Fig. 2 is a plan view of the same, broken away in part; Fig. 3 is a detail view, in section on line 3—3 of Fig. 1, illustrating a portion of the feeding mechanism; Fig. 4 is a sectional elevation of the beater; Figs. 5 and 6 are end views of the beater sections; and Fig. 7 is a plan view with certain of the parts removed.

Referring to these drawings, the spreader consists of a wagon having a body 1, front wheels 2 and rear wheels 3 and 4. At the rear end of the body 1 is the rotary beater 5, and the fertilizer to be distributed is carried to this beater by the floor 6 of the body of the wagon. The floor 6 has the form of an endless, flexible band or apron, and the upper portion thereof is supported by suitable rollers mounted on the frame of the wagon. At its ends, the floor or apron passes over rollers 7, and the lower portion of the apron intermediate its ends is supported by rollers 8 depending from the body of the wagon. The movement of the floor is effected when desired by either or both of the rear wheels of the wagon.

In the drawings, I have shown the wheel 4 as provided with a clutch-member 9 adapted to coöperate with a movable clutch-member 10, which is splined upon the axle 11 of the rear wheels of the wagon. This axle 11 carries a gear 12 adapted to mesh with a pinion 13 suitably mounted upon the body of the wagon or one of the bearings for the rear axle. Secured to the pinion 13, is a crank 14, to which is pivotally connected one end of a connecting-rod 15. The pivotal connection of the rod 15 to the crank 14 may be adjusted toward and away from the axis of the pinion 13, as desired. At its opposleeve 16 arranged to move freely upon a site end, rod 15 is pivotally connected to a lever 17 the lower end of which has an opening therein through which a shaft 18 extends. Loose on this shaft are two wheels 19 and 20 having ratchet-teeth formed on their outer surfaces and bevel-gear teeth formed on the adjacent sides thereof. A bevel-pinion 21 lies between these two bevel-gears and meshes therewith. This pinion is carried by a shaft 22 mounted for rotation in bearings carried by an extension 23 of the frame of the wagon, and at its outer end carries a worm-gear 24 which meshes with a gear 25 on the shaft of one of the wheels 7 about which the floor 6 of the wagon is carried. Fixed to the lever 17 is a frame 26 having two oppositely extending pawls 27 and 28, the former coacting with the ratchet-teeth of the wheel 19 and the latter coacting with the ratchet-teeth of the wheel 20.

Pivotally mounted upon the adjacent side of the body of the wagon, is a bell-crank lever 29, to one end of which is pivotally connected a link 30, the opposite end of which is pivotally connected to the sleeve 16. The other end of the bell-crank 29 has a rod 31 pivotally connected thereto, the opposite end of which is pivotally connected to a lever 32 pivotally mounted upon the side of the wagon at a point near the seat for the driver. By operating the lever 32, the bell-crank lever 29 may be rocked upon its pivot, so as to raise or lower the sleeve 16 upon the lever 17; in this way, the extent of movement of the lever 17 about the shaft 18 effected by the rotation of the crank 14 may be adjusted as desired. When the lever 17 is moved in one direction, one of the pawls 27 and 28 catches upon the teeth of its corresponding ratchet-wheel, so as to rotate the latter and with it the pinion 21 and shaft 22, and when the lever 17 is rocked in the other direction the other pawl engages the teeth of its ratchet-wheel, so as to rotate pinion 21 and shaft 22. Thus whenever the clutch consisting of the members 9 and 10 is in the operative position and the wagon is in motion, the floor of the body of the wagon will be moved in a direction to carry the upper portion thereof toward the beater 5, and the rate at which this movement takes place may be regulated as desired by moving the lever 32 and thus raising or lowering the sleeve 16. Provision is preferably made for a further adjustment by providing means for connecting the link 30 to the bell-crank lever 29 at points other than those at which they are shown in the drawings as being connected, as will be seen in Fig. 1.

The rotary beater comprises a shaft 33, one end of which is secured to one side of the body of the wagon by a bracket 34 and the other end of which is secured to the opposite side of the wagon by a bracket 35. The shaft 33 is held stationary in these brackets. The shaft may be bent to conform to the arc of a circle, as shown in Fig. 4, or it may consist of a number of short sections, each bent at a slight angle to the adjacent sections. A plurality of beater-sections 36 are mounted upon the shaft 33 and coupled together so as to rotate in unison. Each of these sections consists of a spider 37 having a plurality of arms, each carrying a block 38 having a plurality of pins 39 projecting therefrom. Each of the spiders 37 is formed integral with a sleeve 40, through which the shaft 33 extends, and the bore of this sleeve is made substantially larger than the shaft 33 except at two points adjacent to the ends of the sleeve, where the opening is contracted to substantially the cross-sectional area of the shaft 33, so as to provide bearing points for the beater-sections at the ends of the sleeve. The sleeve 40 of each beater-section is formed at one end to provide a socket 41 and at the other end to provide a head 42, each socket 41 being adapted to receive the head 42 of the adjacent section. The sockets and heads are provided with coacting parts which will serve to transmit motion from one beater-section to the other, which will provide the requisite flexibility of each section relatively to the adjacent ones, and which will permit of the sections being readily assembled and separated. The beater-section at the end adjacent to the bracket 35 may have a bevel-gear 43 formed integral therewith, or such a bevel-gear may, as shown in Fig. 4, be coupled to this end beater-section just as that section is coupled to the adjacent section. The bevel-gear 43 meshes with a bevel-gear 44 loose upon a shaft 45 secured to the frame of the wagon, and fixed to or integral with the gear 44 is a sprocket-wheel 46. A chain 47 runs on this sprocket-wheel and on a similar wheel 48 carried by the rear axle of the wagon. Splined on the rear axle 11 is a clutch-member 50 adapted to coact with a clutch-member 51 which is secured to the rear wheel 3. When the clutch-members 50 and 51 are in coaction and the wagon is in motion, the rotation of the wheel will be transmitted by the chain 47 and the gears 44 and 43 to the beaters, so as to cause them to rotate in a direction to take up the fertilizer brought to them by the moving floor of the wagon body and distribute it over the fields.

The construction of the beater-sections herein shown and described, I have found in practice to give excellent results, and results superior to those obtained with beaters of this type heretofore used, this being due particularly to the fact that the bores of the beater-sections are made large except at the two bearing points shown, and therefore one beater-section will not bind with another, and furthermore if a beater-section were to move axially upon the shaft 33 it would not bind upon that shaft, whether the shaft were curved throughout its length or were made up of a series of sections, each disposed at an angle to the adjacent ones. Furthermore, the construction whereby the sections are flexibly coupled together permits the sections to be readily separated when that is necessary in repairing a beater-section or substituting a new one therefor.

In order to assist in effecting an even distribution of the fertilizer, a rake is provided, adapted to coöperate with the beater, and in order to secure the best results this rake is made to conform to the shape of the beater; that is, it is formed on the arc of a circle, just as the beater is. The rake 52 is shown in its operative position in Fig. 1, and it will be seen in this figure that the tines 53 of the rake extend downwardly in close proximity to the upper portion of the beater 5. The curvature of the rake is shown in Figs. 2 and 7. The ends 54 of the rake are of substantial length and are pivotally connected to the sides of the body of the wagon. In the position in which it is shown in Fig. 1, the rake is supported by bars 55, one at either side of the body of the wagon, and these bars have eyes in their upper ends, through which rods 56 extend loosely, these rods being connected to the rake. Springs 57 are coiled about the rods 56 between the rake and the upper ends of the bars 55, so that these springs serve to hold the rake in the position in which it is shown with a yielding pressure; however, should such movement be required, the rake 52 may move upwardly away from the beater against the tension of the springs 57.

In accordance with my invention, I have provided means whereby the rake may be moved from its operative position in coaction with the beater to a position in the bottom of the wagon and immediately in front of the beater, in which position it will serve as an end-gate. For this purpose the pivotal connection of the ends 54 of the rake to the sides of the body of the wagon consists of slots 58 in the arms 54 and pins passing through these slots and into the sides of the wagon, and means are provided for effecting a movement of the arms 55. At its lower end the bar 55 on the side of the wagon shown in Fig. 1 is pivotally connected to one arm of a bell-crank lever 59, which is fixed upon a shaft 60 adapted to rock in bearings formed in the frame of the wagon, and at the other side of the machine the shaft 60 has an arm 61 secured thereto, to which the lower end of the bar 55 on that side of the machine is pivotally connected. The other end of the bell-crank lever 59 is pivotally connected to one end of a rod 62, the other end of which is pivotally connected to a lever 63 pivotally mounted upon the side of the wagon in a position convenient for the operator. The rod 62 is not continuous from one end to the other, but instead has a break therein, the two parts of the rod being connected by a short length of chain 64 for a purpose hereinafter described. The bars 55 intermediate their ends pass through openings formed in the members shown as extending along the top of the sides of the wagon or in brackets secured to the sides of the wagon, so that the bars 55 will coact with the walls of these openings to effect a fore and aft movement of the rake 52 when the latter is raised and lowered.

The rake 52 is raised to its position in coöperation with the beater when it is desired to begin the operation of spreading the fertilizer over the field, and I therefore provide a single means for raising the rake in this way and connecting the beater and the moving floor to the wheels, so as to be driven thereby. It will be seen that the rod 62 is connected to the lever 63 at a point above the pivot. Below the pivot of the lever 63, a rod 65 is pivotally connected to the lever, the other end of this rod being pivotally connected to a three-armed lever 66, which is pivotally mounted upon the side of the wagon. One arm of this lever is connected by a link 67 to a lever 68 pivotally mounted upon one of the members 69 of the frame of the wagon; at the free end of the lever 68, is a semicircular piece 70 having oppositely disposed pins therein extending into a circumferential groove in the clutch-member 10. The third arm of the lever 66 is connected by a rod 71 to a lever 72, which is similar to the lever 68 and is adapted to operate the clutch-member 50. A spring 73 is connected at one end to the rod 71 and at the other to the frame of the wagon, so that this spring tends to hold both of the movable clutch-members in engagement with their coacting clutch-members.

The operation of the spreader when thus constructed will now be described. In preparation for filling the wagon with the fertilizer, the rake 52 is moved to the position in which it is shown in full lines in Fig. 2 and in dotted lines in Fig. 7, in which position it lies directly in front of the beater 5 and serves as an end-gate for the fertilizer. The body 1 having been filled, the wagon is driven to the field over which the fertilizer is to be distributed. When in readiness to start the distribution of the fertilizer, the operator moves the upper end of the lever 63 forward and in doing so rocks the shaft 60 so as to raise the bars 55 and the rake 52 carried thereby. The upward movement of the bars 55 is accompanied by a slight forward movement of the lower ends of the bars, due to the fact that these bars move about the axis of the rock-shaft 60, and this forward movement of the lower ends of bars 55, together with the coaction of the middle portions of the bars with the walls of the openings through which the bars pass, causes the rake 52 to be moved rearwardly while being raised, such rearward movement being permitted by the slots 58, so that when the rake has reached its uppermost position it has been moved rearwardly so that the tines thereof extend downwardly toward and in close proximity to the upper surface of the beater 5. When the lever 63 was moved thus to raise the rake, it also operated to turn the lever 66 on its pivot and thus move the clutch-members 10 and 50 with the tension of the spring 73 into clutching relation to their respective coacting clutch-members 9 and 51. The operation of distributing the fertilizer may then be begun. As the wagon is drawn along, the rotation of the rear wheels transmits rotary motion to the beater 5 and the prongs 39 of the several beater-sections pick up the fertilizer and distribute it evenly over the field. Also the rotation of the wheels causes rotation of pinion 13 and oscillation of the rod 15 and lever 17. Movement of the lever 17 effects the feed of the movable bottom 6 of the body of the wagon in a direction to cause the upper portion thereof to move toward the beater, and this movement of the floor of the wagon carries the fertilizer to the beater. The rate at which the movement of the floor 6 takes place may be regulated as desired by movement of lever 32, which operates to raise or lower the sleeve 16 and thus narrow or widen the limits between which the rod 17 is oscillated.

If it is desired at any time to discontinue the operation of distributing the fertilizer, the lever 63 is moved in the opposite direction, and this rocks the three-armed lever 66 in such a way as to cause the clutch-members 10 and 50 to be drawn out of engagement with their respective coacting clutch-members 9 and 51, so that the machine is rendered inoperative by discontinuing the rotation of the beater and the feed of the flexible floor 6. In moving the lever 63 thus, the rake 52 is not drawn down from the position in which it is shown in Fig. 1 to that in which it is shown in Fig. 2, because of the provision of the length of chain 64 in the rod 62. This length of chain is provided so that the spreading operation may be discontinued before the body of the wagon has been entirely emptied, and when it is desired to do this, the rake 52 should not be lowered, since forcing its tines through the fertilizer immediately in front of the beater could only be effected with great difficulty.

It will be seen that either of the two clutches consisting of the members 9 and 10 and 50 and 51 will serve to connect both the beater and the floor feed to its respective rear wheel so that either rear wheel can drive both of these devices, since the rear shaft 11 is mounted for rotation in its bearings, the wheels are loose thereon, and the clutch-members 9 and 50 are splined thereto. Therefore when the clutches are thrown in and either rear wheel is turning, both the beater and the feed device will be operated. For this reason when the wagon is being turned and only one wheel is being rotated, the spreading operation will be continued.

Having now described my invention, what I claim as new therein and desire to secure by Letters Patent is as follows:—

1. A spreader comprising the combination of a body, a wheel, a beater mounted for rotation on the body, means for connecting the wheel to the beater to rotate the latter, a rake, arms carrying the rake and pivotally mounted on the body to permit movement of the rake, levers for moving said arms about their pivots, connections from the levers to the arms, and springs in said connections permitting yielding movement of said arms and the rake carried thereby independently of said levers in the direction of the length of the tines of the rake and toward and away from the beater, substantially as set forth.

2. A spreader comprising the combination of a body, a wheel, a beater mounted for rotation upon the body, means for connecting the wheel to the beater to rotate the latter, a rake, arms carrying the rake pivotally connected to the body, and means for simultaneously turning said arms on their pivots and moving them in the direction of their length to raise the rake and move it rearward bodily over the beater, substantially as set forth.

3. A spreader comprising the combination of a body, a wheel, a beater mounted for rotation upon the body, means for connecting the wheel to the beater to rotate the latter, a rake, arms carrying the rake pivotally connected to the body, means for simultaneously turning said arms on their pivots and moving them lengthwise and to carry the rake bodily over the beater, and springs for pressing the rake down upon the beater, substantially as set forth.

4. A spreader comprising the combination of a body, a wheel, a beater mounted for rotation upon the body, means for connecting the wheel to the beater to rotate the latter, a rake, arms carrying the rake connected to the body by pin and slot connections, levers connected to the arms for operating them, and means for simultaneously rocking said levers to move the rake rearward with respect to the body and moving them in a direction to turn said arms about the pins of said connections, substantially as set forth.

5. A spreader comprising the combination of a body, a wheel, a beater mounted for rotation upon the body, means for connecting the wheel to the beater to rotate the latter, a rake, arms carrying the rake connected to the body by pin and slot connections, levers connected to the arms for operating them, means for simultaneously rocking said levers and moving them in the direction of their length, and springs for pressing the rake yieldingly toward the beater, substantially as set forth.

6. A spreader comprising the combination of a body, a wheel, a beater mounted for rotation upon the body, means for connecting the wheel to the beater to rotate the latter, a rake, arms carrying the rake connected to the body by pin and slot connections, guides on said body, levers passing through said guides and connected to said arms above the guides, and means for imparting to portions of said levers below the guides movement in the arc of a circle, to carry the rake upwardly and rearwardly with respect to the body, substantially as set forth.

7. A spreader comprising the combination of a body, rear wheels, a shaft mounted on the body and bent to approximate a curve, a plurality of inter-connected beater sections on said shaft, means for connecting the beater-sections to a wheel, a movable floor for said body, means for connecting said floor to a wheel, a rake mounted on the body by pin and slot connections and curved to conform to said beater-sections, and a single means for simultaneously rendering the spreading mechanism operative and moving said rake both vertically and rearwardly to a position above the beater with the tines extending downwardly toward the beater, substantially as set forth.

This specification signed and witnessed this 30th day of July, 1909.

FRANK H. RYDER.

Witnesses:
GEORGE D. RYDER,
SANFORD S. MYERS.